United States Patent
Sivakkolundhu et al.

(10) Patent No.: US 8,271,510 B2
(45) Date of Patent: Sep. 18, 2012

(54) TRANSLATING AND GEOCODING ADDRESSES

(75) Inventors: Premanand Sivakkolundhu, Tampa, FL (US); Sutap Chatterjee, Tampa, FL (US); Josy John, Wesley Chapel, FL (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 291 days.

(21) Appl. No.: 12/647,722

(22) Filed: Dec. 28, 2009

(65) Prior Publication Data

US 2011/0161334 A1 Jun. 30, 2011

(51) Int. Cl.
*G06F 7/00* (2006.01)
*G06F 17/30* (2006.01)
(52) U.S. Cl. .................................................. 707/758
(58) Field of Classification Search .................. 707/758
See application file for complete search history.

(56) References Cited

U.S. PATENT DOCUMENTS

| | | | |
|---|---|---|---|
| 7,376,636 B1 * | 5/2008 | Wang et al. | 707/694 |
| 2003/0225725 A1 * | 12/2003 | Miller et al. | 707/1 |
| 2008/0046922 A1 * | 2/2008 | Jankins et al. | 725/35 |
| 2008/0255758 A1 * | 10/2008 | Graham et al. | 701/209 |
| 2009/0177643 A1 * | 7/2009 | Gupta et al. | 707/5 |

* cited by examiner

*Primary Examiner* — Robert Beausoliel, Jr.
*Assistant Examiner* — Nicholas Allen

(57) ABSTRACT

A device may include a memory and a processor. The memory may be configured to store a regular address database and store a translated address database. The processor may be configured to perform a lookup, in the regular address database, of a regular address that corresponds to a working address. In addition, the processor may be further configured to determine whether the working address is qualified to be converted into an address comprising aliases that correspond to terms in the working address when the regular address is not found in the translated address database, and convert the working address to generate a first translated address when the working address is qualified to be converted.

23 Claims, 12 Drawing Sheets

1100

SETTING PARAMETERS FOR TRANSLATION
1102

IDENTIFYING PENDING TRANSLATION IN PROGRESS
1104

IDENTIFYING ADDRESS CHANGES
1106

HANDLING OUTPUT
1108

HANDLING ALIAS
1110

1110

| DIRECTION ALIAS 1226 |
|---|
| STREET NAME 1228 |
| HOUSE NUMBERS 1230 |
| HOUSE NUMBER SUFFIX 1232 |
| SUPPLEMENTAL ALIAS 1234 |

TRANSLATING AND GEOCODING ADDRESSES

BACKGROUND INFORMATION

An order provisioning system may perform many tasks. For example, an order provisioning system may provide a price list and/or product description, accept orders from customers, and process orders. In accepting and processing orders, the system may enter customer addresses into one or more working databases.

DETAILED DESCRIPTION OF PREFERRED EMBODIMENTS

The following detailed description refers to the accompanying drawings. The same reference numbers in different drawings may identify the same or similar elements. As used herein, the term "geocode" may refer to an alphanumeric representation (e.g., a United States National Grid (USNG) coordinate) of a geographical location.

Figure 1:
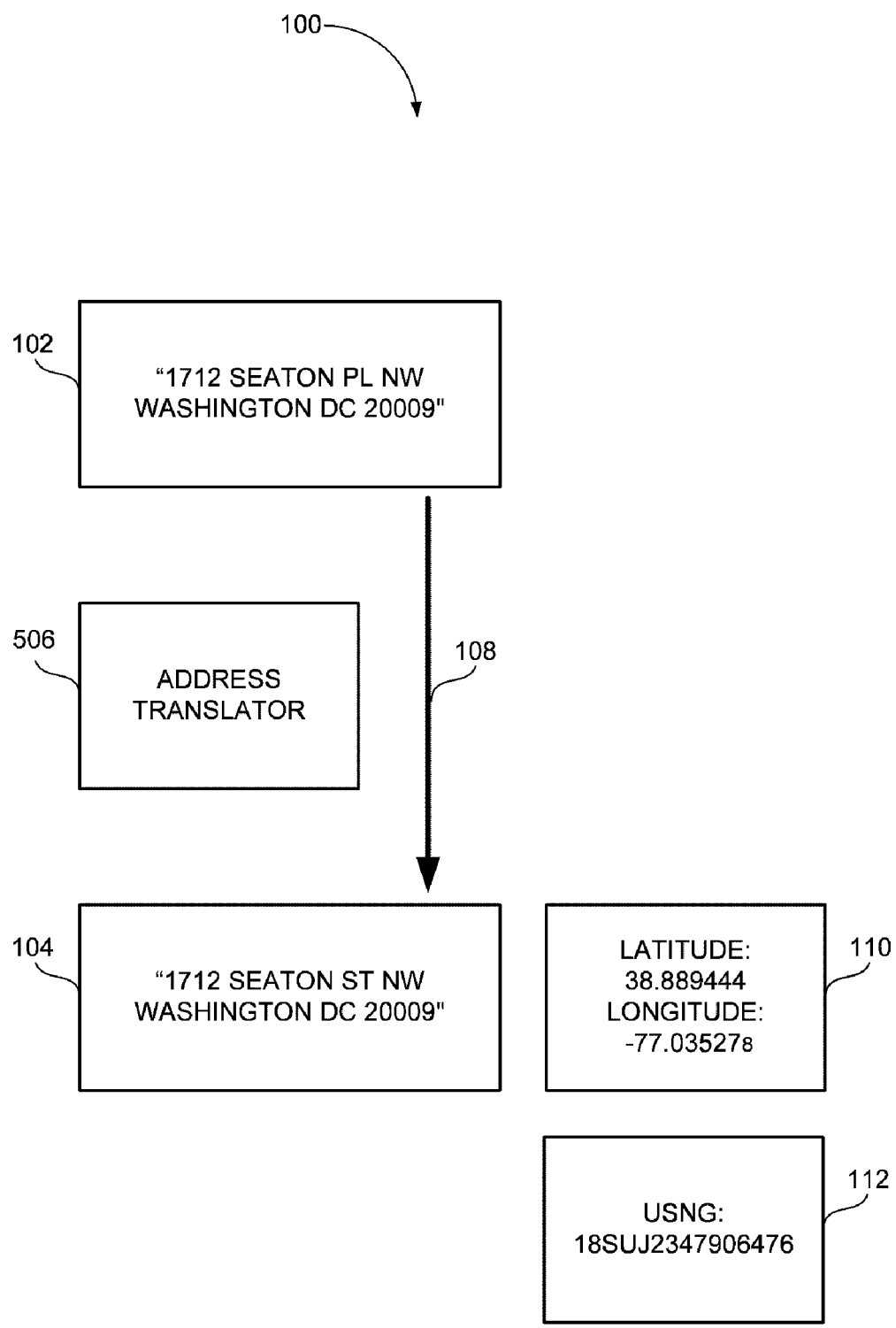
FIG. 1 illustrates one of the concepts described herein.

In the following description, a system may translate and geocode one set of addresses based on a different set of addresses. FIG. 1 illustrates one of the concepts described herein. In system 100, an address translator 506 translates a given address in one format to an address in another format. For example, as shown, an address 102 is expressed in a working format, as "1712 SEATON PL NW WASHINGTON DC 20009." Address translator 506 translates/identifies address 102 as address 104 in regular (typical) format, "1712 SEATON ST NW WASHINGTON DC 20009" based on a set of translation rules.

Once address 104 is obtained, address translator 506 may obtain longitude and latitude of translated address 104 and convert the latitude and longitude 110 into USNG coordinates 112 (i.e., geocode address 104). In addition, address translator 506 may associate address 102 with address 104, as indicated by arrow 108. In some implementations, address translator 506 may also generate a match code that indicates how well address 104 matches address 102.

By translating working addresses 102 into regular addresses 104 and/or geocoding the translated regular addresses, system 100 may provide advantages and convenience associated with the geocoded, regular addresses. For example, regular addresses (e.g., United States Postal Service (USPS) addresses) may be standardized.

In another example, a location can be uniquely described by a geocode. In contrast, using longitude and latitude, a location can be described in many ways (e.g., degrees only, degrees and minutes, etc.). This can be confusing. Using geocodes, a distance between two locations can be easily determined (e.g., by applying the Pythagorean theorem). In contrast, to determine a distance between two locations described in longitudes and latitudes, it is necessary to use an inverse trigonometric function.

Figure 2:
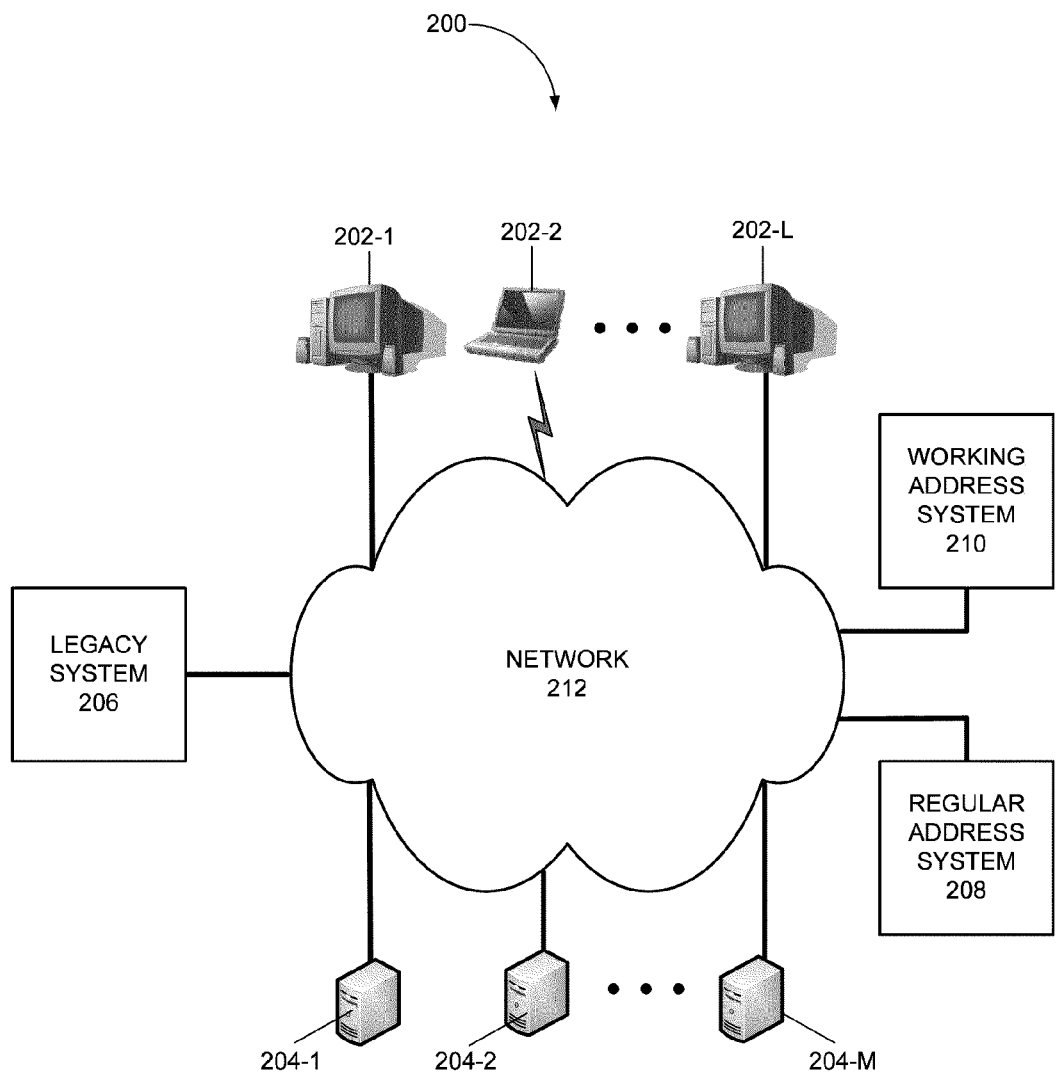
FIG. 2 shows an exemplary network in which the concepts described herein may be implemented.

FIG. 2 shows an exemplary network 200 in which the concepts described herein may be implemented. As shown, network 200 may include client devices 202-1 through 202-L (collectively "client devices 202" and individually "client device 202"), provisioning platforms 204-1 through 204-M (collectively "provisioning platforms 204" and individually "provisioning platform 204"), a legacy order entry system 206, a regular address system 208, a working address system 210, and network 212.

Network 200 is illustrated for the purpose of simplicity and ease of understanding. Consequently, network 200 does not show other network components, such as routers, switches, etc. In addition, depending on the implementation, network 200 may include fewer, additional, or different devices than those illustrated in FIG. 2. For example, in one implementation, network 200 may not include legacy order entry system 206.

Each of client devices 202 may include a client application for placing an order or determining the status of an order at one of provisioning platforms 204. Depending on the implementation, via the client application, a user may place an order for tangible or intangible goods/services (e.g., a manufactured product, a widget, a service, etc.). For example, in some implementations, a user may place an order for a telephone number to be assigned to the user or to an address.

Provisioning platforms 204 may include one or more server applications for receiving orders from client devices 202. In one implementation, provisioning platforms 204 may receive working addresses that are part of the orders from client devices 202. Provisioning platforms 204 may send one set of addresses (e.g., "working addresses") in one format to working address system 210 to be stored and processed.

Legacy order entry system 206 may include a device for submitting orders to provisioning platforms 204 via legacy hardware and software. For example, assume that one of provisioning platforms 204 includes an inventory of telephone numbers and addresses. In such instances, legacy order entry system 206 may request the provisioning platform 204 to assign a telephone number to a plain old telephone system (POTS) customer via a legacy application/interface.

Regular address system 208 may store addresses (e.g., "regular addresses") in another format, and their coordinates. In one implementation, the addresses may be in the USPS format, and the coordinates may be in longitude and latitude.

Working address system 210 may receive working addresses (e.g., a set of addresses in a format different from a format for regular addresses) from provisioning platforms 204, store the working addresses, translate or process the working addresses, and manage the translated addresses. In addition, working address system 210 may provide services, such as looking up translated addresses based on longitudes and latitudes and/or geocodes.

Network 212 may include a fiber-optics network (e.g., passive optical networks (PONS)), an ad hoc network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks.

Devices (e.g., client devices 202, provisioning platforms 204, etc.) that are shown in FIG. 2 may connect to network 212 via wireless or wired communication links. In addition, network 212 may allow any of devices 202, platforms 204, and systems 206-210 to communicate with any other device 202, platform 204, and system 206, 208 or 210. In some embodiments, devices 202, platforms 204, and systems 206-210 may communicate with each other directly rather than through network 212.

Figure 3:
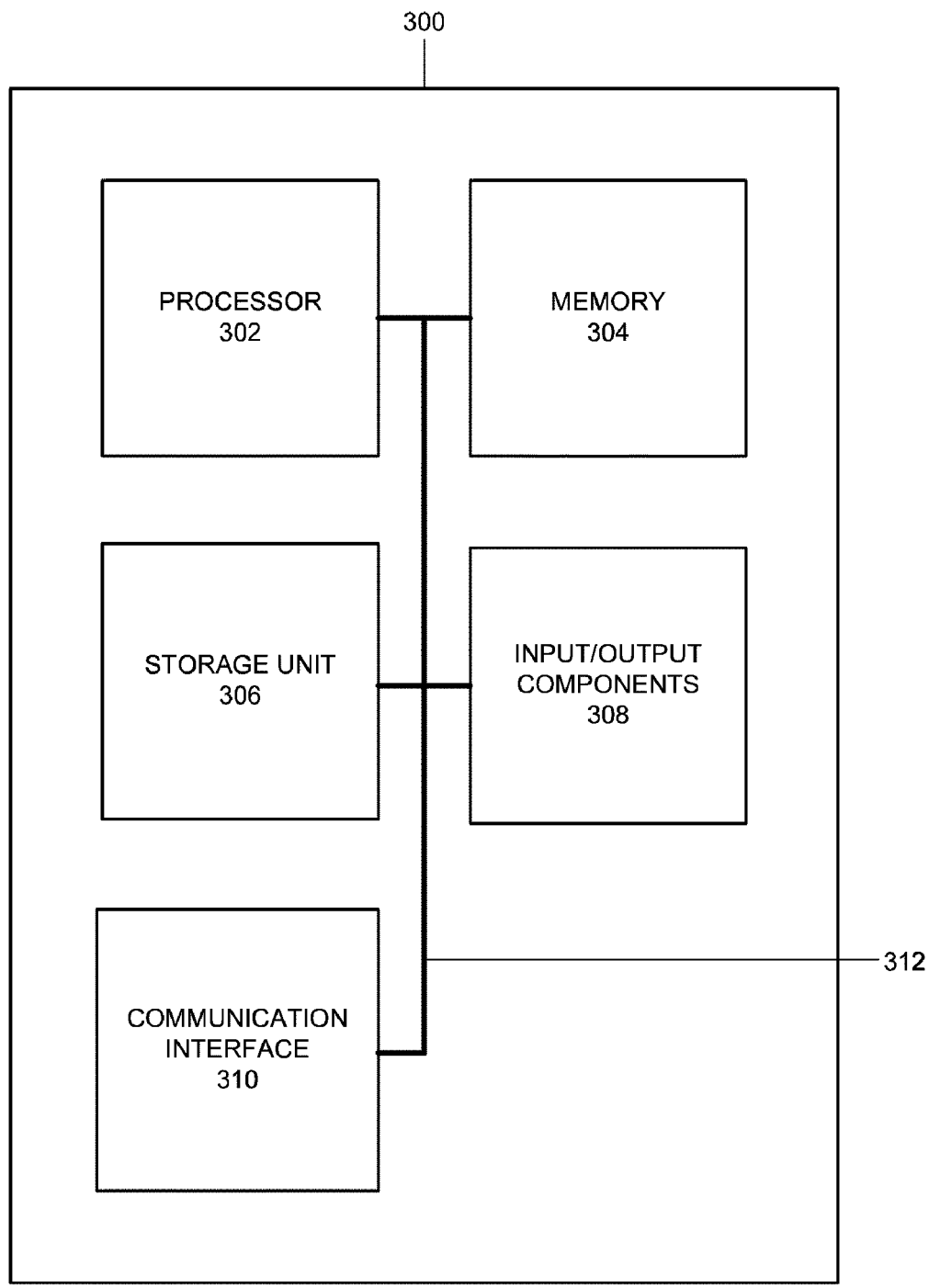
FIG. 3 is a block diagram of exemplary components of a network device of FIG. 2.

FIG. 3 is a block diagram of exemplary components of a network device 300. Network device 300 may represent client device 202 or a device in provisioning platform 204, legacy system 206, regular address system 208, or working address system 210. As shown, network device 300 may include a processor 302, memory 304, storage unit 306, input/output components 308, communication interface 310, and bus 312. Depending on the implementation, network device 300 may include additional, fewer, or different components. For example, network device 300 may include one or more power supplies, fans, motherboards, video cards, display screens, etc.

Processor 302 may include one or more processors, microprocessors, application specific integrated circuits (ASICs), field programmable gate arrays (FPGAs), or other processing logic that may interpret and execute instructions.

Memory 304 may include static memory, such as read only memory (ROM), and/or dynamic memory, such as random access memory (RAM), or onboard cache, for storing data and machine-readable instructions. Storage unit 306 may include a magnetic and/or optical storage/recording medium. In some implementations, storage unit 306 may be mounted under a directory tree or mapped to a drive.

Input/output components 308 may include a display (e.g., a cathode ray tube, a liquid crystal display (LCD), an organic light emitting diode (OLED) display, etc.), a keyboard, a mouse, a speaker, a microphone, a Digital Video Disk (DVD) writer, a DVD reader, Universal Serial Bus (USB) ports, and/or other types of components for converting physical events or phenomena to and/or from digital signals that pertain to network device 300.

Communication interface 310 may include any transceiver-like mechanism that enables network device 300 to communicate with other devices and/or systems. For example, communication interface 310 may include mechanisms for communicating via a network, such as a wireless network. In these implementations, communication interface 310 may include one or more radio frequency (RF) transmitters, receivers and/or transceivers and one or more antennas for transmitting and receiving RF data. For example, communication interface 310 may include a radio or television tuner, a mobile telephone transceiver, etc. Communication interface 310 may also include a modem or an Ethernet interface to a LAN or other network for communicating with other devices. Bus 312 may provide an interface through which components of network device 300 can communicate with one another.

Figure 4:
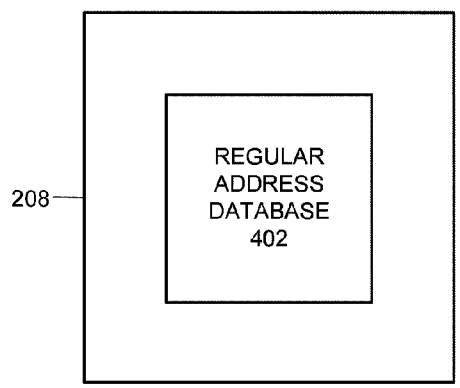
FIG. 4 is a block diagram of a functional component of an exemplary regular address system of FIG. 2.

FIG. 4 is a block diagram of an exemplary functional component of regular address system 208. As shown, regular address system 208 may include a regular address database 402. In FIG. 4, regular address system 208 is shown for the purpose of simplicity and ease in understanding. In an actual implementation, regular address system 208 may include additional, fewer or different arrangement of components (e.g., an operating system, firewall, etc.).

Regular address database 402 may include records of addresses and corresponding location coordinates in longitude and latitude format. Another device or system (e.g., working address system 210) may perform a lookup in regular address database 402 based on search criteria.

Figure 5:
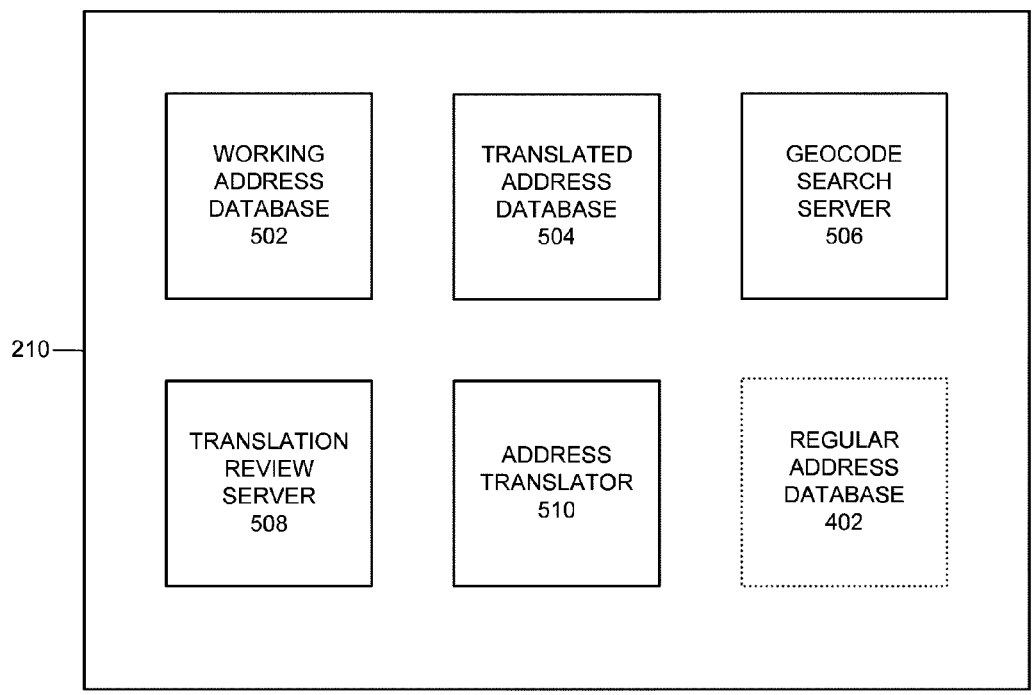
FIG. 5 is a block diagram of functional components of an exemplary working address system of FIG. 2.

FIG. 5 is a block diagram of exemplary functional components of working address system 210. As shown, working address system 210 may include a working address database 502, translated address database 504, geocode search server 506, translation review server 508, and address translator 510. In some implementations, as shown by the dashed line in FIG. 5, working address system 210 may also include a local copy of regular address database 402.

Working address database 502 may include records of working addresses in one format. In one implementation, provisioning platforms 204 may send the working addresses to working address system 219 for storing in working address database 502. Translated address database 504 may include records of addresses. Each record may include a working address, a corresponding regular address or a reference to the corresponding regular address, a geocode, a longitude and latitude, and a match code. A "match code," as used herein, may refer to a value that indicates how well a working address matches a regular address (e.g., number of matching, weighted words, etc.).

Geocode search server 506 may provide addresses retrieved from translated address database 504 in response to a request that specifies a longitude, latitude, and/or geocode. The request may be received from another component or a device (e.g., client device 202, a device at provisioning platform 204, etc.), and may specify one or more boundaries of a region in which the search is to be performed. In response to the request, geocode search server 506 may retrieve the addresses from translated address database 504 based on the specified boundaries.

Figure 6:
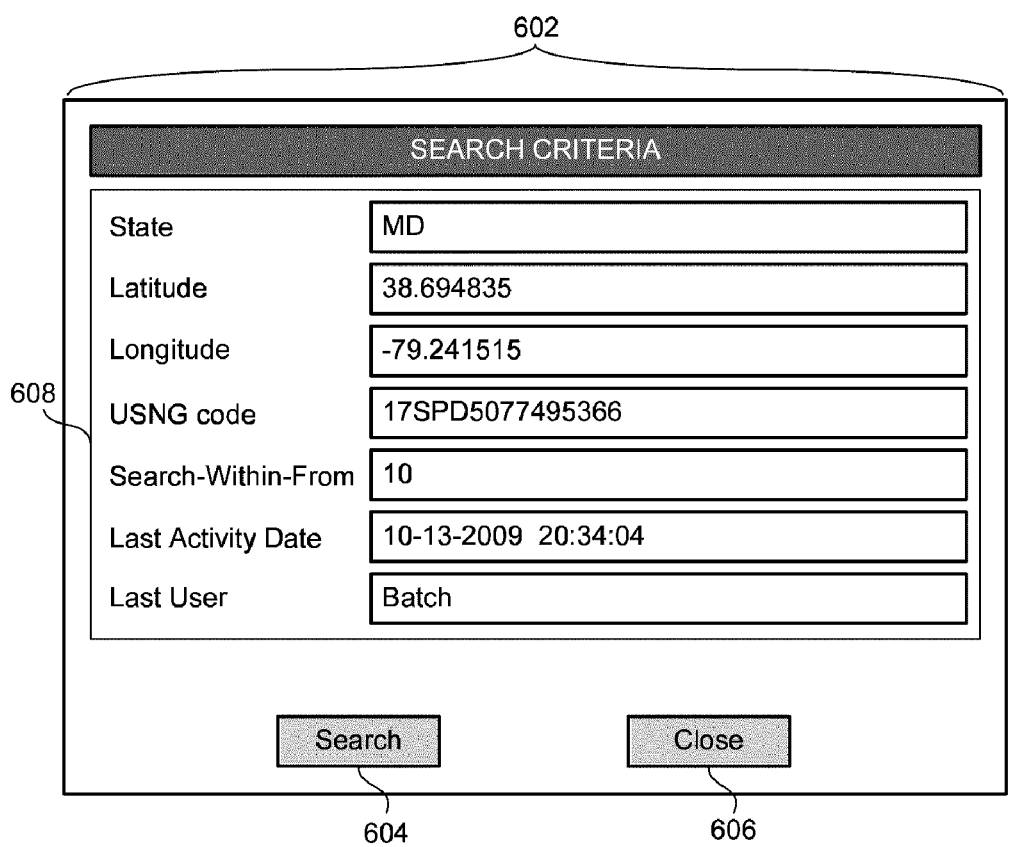
FIG. 6 illustrates an exemplary graphical user interface (GUI) window of a client application for sending a search request to an exemplary geocode search server of FIG. 5.

In one implementation, geocode search server 506 may receive the request for addresses from a client application installed on a device at working address system 210 or another device. FIG. 6 illustrates an exemplary graphical user interface (GUI) window 602 of the client application for relaying search criteria to geocode search server 506.

As shown, GUI window 602 may include a search button 604, close button 606, and criteria pane 608. In other implementations, GUI window 602 may include additional, fewer, or different components than those shown in FIG. 6.

Search button 604, when activated (e.g., clicked with a mouse), may cause the client application (not shown) to send a search criteria provided in search pane 608 to geocode search server 506. Upon receipt of a result from geocode search server 506, the client application may display the result in another window (not shown). Close button 606, when activated, may cause the client application to close GUI window 602.

Criteria pane 608 may receive search parameters. As shown, the parameters may include a state (e.g., Virginia, Maryland, etc.), latitude and longitude, a USNG code (e.g., Natural Area Code (NAC), Military Grid Reference System (MGRS) code, etc.), a time of last activity (e.g., the time of last modification to translated address database 504, time of last search in translated address database 504, etc.), and a user identifier associated with the last user that accessed translated address database 504. In addition, criteria pane 608 may receive search boundaries via a Search-Within-From field.

When the client application receives the search parameters that are specified via criteria pane 608 and search button 604, the client application may send the parameters to geocode search server 506. Subsequently, geocode search server 506 may search, in translated address database 504, for addresses whose locations are within a square area having a width that is twice the value in the Search-Within-From field in criteria pane 608. The square area may be centered about the values specified in the latitude and longitude fields in criteria pane 608.

Figure 7:
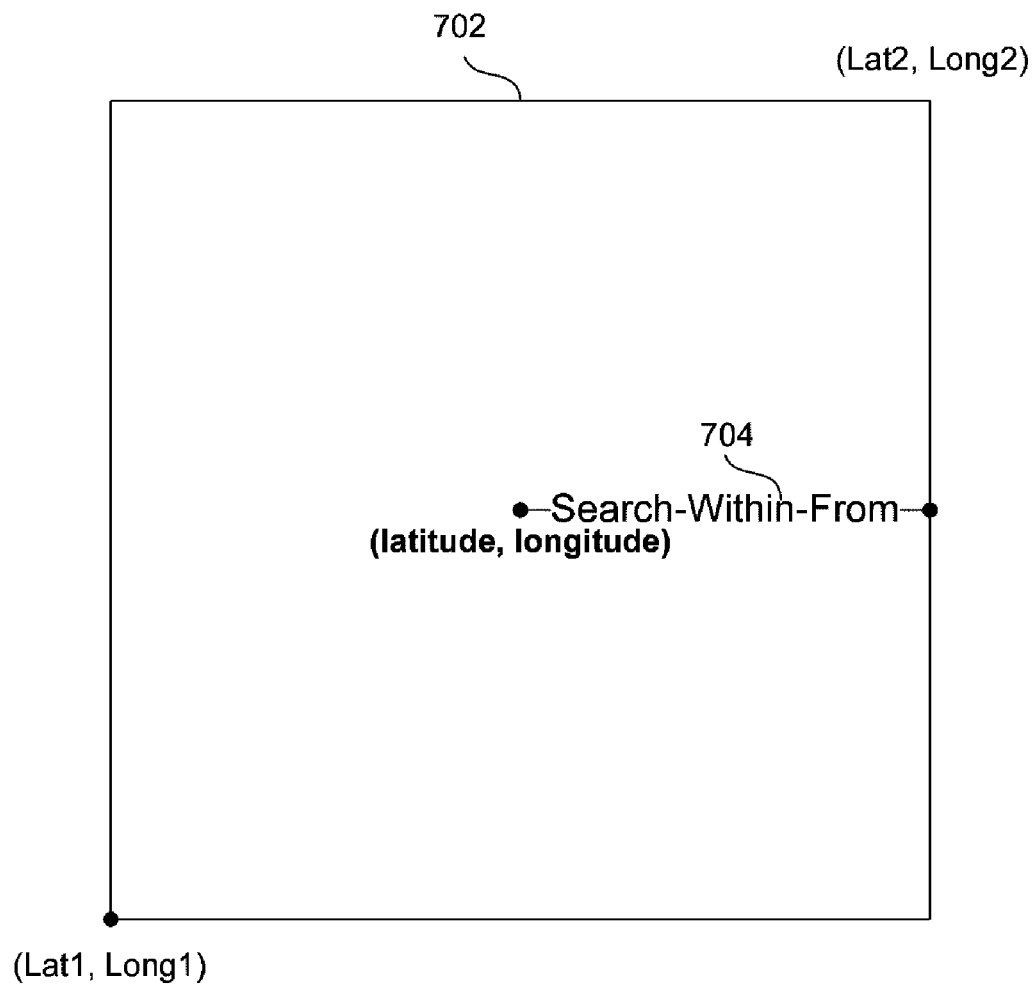
FIG. 7 shows an exemplary square area associated with search criteria provided in the GUI window of FIG. 6.

FIG. 7 shows the square area 702 for which geocode search server 506 may search addresses in translated address database 504. As shown, the latitude and the longitude provided in criteria pane 608 correspond to the center of square area 702. A Search-Within-From 704 corresponds to the value provided in the Search-Within-From field in criteria pane 608. Accordingly, to search the database, geocode search server 506 may make a query to translated address database 504, requesting a list of addresses whose corresponding locations are between Lat1 and Lat2 and between Long1 and Long2 (see FIG. 7). Lat1, Lat2, Long1, and Long2 can be determined in accordance with the following expressions:

$$Lat1 = \arcsin\left(\sin(\text{latitude}) \cdot \cos(\text{Search-Within-From}/R) + \cos(\text{latitude}) \cdot \sin*(\text{Search-Within-From}/R)/\sqrt{2}\right) \quad (1)$$

$$Long1 = \text{longitude} + \arctan\left(\left[\sin(\text{Search-Within-From}/R) \cdot \cos(\text{latitude})/\sqrt{2}\right] / \left[\cos(\text{Search-Within-From}/R) - \sin(\text{latitude}) \cdot \sin(Lat1)\right]\right) \quad (2)$$

$$Lat2 = \arcsin\left(\sin(\text{latitude}) \cdot \cos(\text{Search-Within-From}/R) - \cos(\text{latitude}) \cdot \sin*(\text{Search-Within-From}/R)/\sqrt{2}\right) \quad (3)$$

$$Long2 = \text{longitude} - \arctan\left(\left[\sin(\text{Search-Within-From}/R) \cdot \cos(\text{latitude})/\sqrt{2}\right] / \left[\cos(\text{Search-Within-From}/R) - \sin(\text{latitude}) \cdot \sin(Lat1)\right]\right) \quad (4)$$

In expression (1) through (4), R is the radius of the earth.

Returning to FIG. 5, translation review server 508 may provide addresses retrieved from translated address database 504 in response to a request that specifies criteria for searching translated address database 504. Upon receipt of the addresses from translation review server 508, the requesting party may review the translated addresses.

Figure 8:
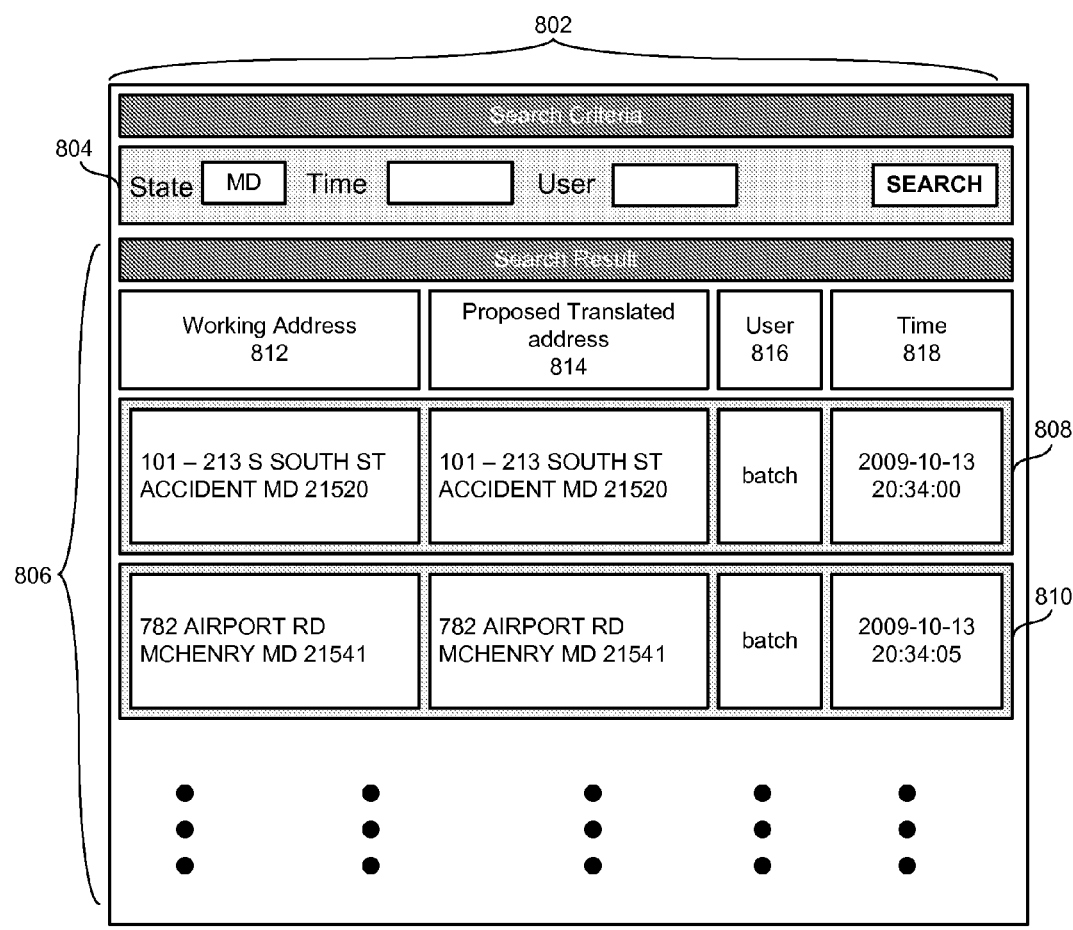
FIG. 8 illustrates an exemplary GUI window for searching addresses in the working address system of FIG. 2.

In one implementation, translation review server 508 may receive the request for addresses from a client application installed on a device at working address system 210 or another device. FIG. 8 illustrates an exemplary GUI window 802 of the client application for relaying the request to translation review server 508.

As shown, GUI window 802 may include a criteria pane 804 and a search result pane 806. Criteria pane 804 may include fields to receive criteria, such as a state (e.g., Washington, New Mexico, etc.), an approximate time of when addresses were translated, and a user identifier that is associated with the translation. In other implementations, the state field may refer to another type of jurisdiction, such as province, country, etc. The client application may send the criteria in criteria pane 804 to translation review server 508.

Upon receipt of a result of a search from translation review server 508, the client application may show the result in search result pane 806. As shown in FIG. 8, search result pane 806 may display records, two of which are illustrated as record 808 and record 810. As further shown, each record may include a working address field 812, proposed translated address field 814, user field 816, and time field 818.

Working address field 812 and proposed translated address field 814 may display a working address and a translated address that correspond to the working address. The translated address shown in proposed translated address field 814 may be finalized upon user or operator approval. For example, in record 808, working address field 812 includes "101-213 S SOUTH ST ACCIDENT MD 21520" and proposed translated address field 814 includes "101-213 SOUTH ST ACCIDENT MD 21520." "101-213 SOUTH ST ACCIDENT MD 21520" may be stored in translated address database 514 as a final address upon an operator approval.

User field 816 and time field 818 may include, respectively, an identifier associated with the operator that has executed the translation process and a time when the translation has been performed.

Depending on the implementation, criteria pane 804 and records in search result pane 806 may include fewer, additional, or different criteria (e.g., a communication center (e.g., a wire center), status of the addresses, etc.)) and fields.

Returning to FIG. 5, address translator 510 may include hardware and/or software for translating working addresses in working address database 502 into regular addresses in translated address database 504. In addition, address translator 510 may geocode the working addresses.

Figure 9:
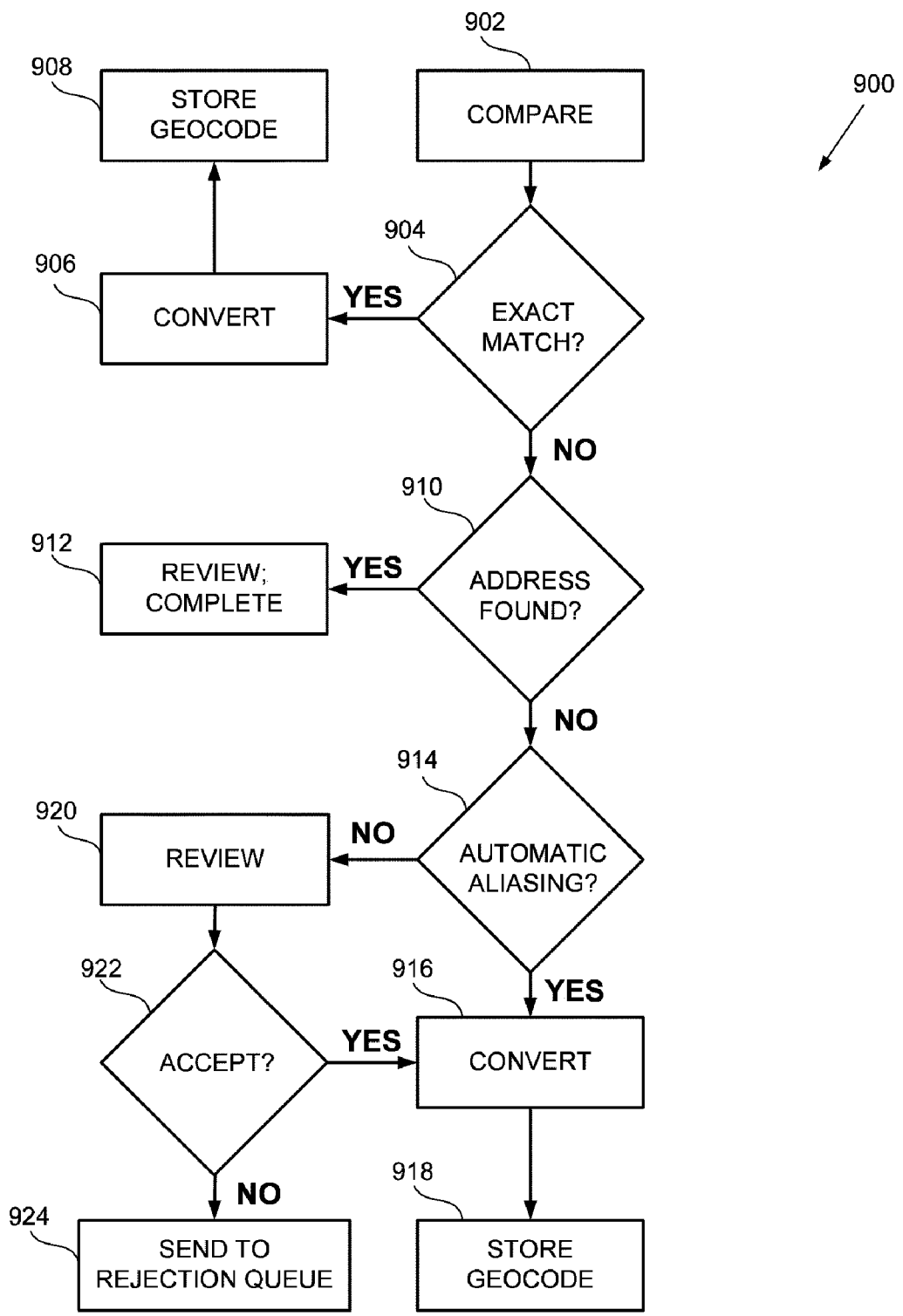
FIG. 9 is flow diagram of an exemplary process for translating and geocoding working addresses.

FIG. 9 is an exemplary process 900 for translating and geocoding each of working addresses in working address database 502. Address translator 510 may start process 900 by comparing a working address to regular addresses in regular address database 402, to find a regular address that matches the working address. For example, as shown in record 810 (FIG. 8), assume that the working address is "782 AIRPORT RD MCHENRY MD 21541." Address translator 510 may compare the working address to the regular address "782 AIRPORT RD MCHENRY MD 21541." In this case, address translator 510 may determine that the working address and the regular address match. In addition, address translator 510 may determine a match code. Depending on the implementation, a match code may represent a percentage/fraction of words, in the working address, that match words in the regular address; percentage/fraction of matching characters; fraction of mismatching words; etc.

If address translator 510 identifies a regular address found in regular address database 402 as an exact match (block 904—YES), address translator 510 may convert a latitude and longitude of the regular address into a geocode (block 906). For example, assume that the latitude and the longitude are, respectively, 38.694835 and −79.241515 (see FIG. 6). Address translator 510 may convert the longitude and latitude into a geocode (e.g., NAC of "17SPD5077495366"). Thereafter, address translator 510 may complete the translation by: creating a record that includes the working address, the geocode, the regular address or a reference to the regular address (e.g., an association) (block 908), the longitude and latitude, and a match code indicating how well the regular address matches the working address.

If the regular address is not an exact match (block 904—NO), address translator 510 may determine whether the regular address is found in translated address database 504 (block 910). If the regular address is found (block 910—YES), address translator 510 may send the working address and regular address to an operator for a review (block 912). Upon receiving operator approval, address translator 510 may complete the translation (e.g., perform acts 906 and 908) or correct any issues (BLOCK 912).

If the regular address is not found (block 910—NO), address translator 510 may determine whether the working address qualifies for automatic aliasing (i.e., automatic translation) (block 914). For example, address translator 510 may determine whether a match code that is associated with the regular address and the working address is greater than a particular threshold. If the working address qualifies for automatic aliasing (e.g., the match code>threshold) (block 914—YES), address translator 510 may perform the translation (block 916). Subsequently, address translator 510 may create a record that includes the working address, the geocode, the translated address, and a match code (block 918).

Returning back to block 914, if the working address does not qualify for automatic aliasing (block 914—NO), an operator may review the regular address (block 920). If the operator does not accept the regular address (block 922—NO), address translator 510 may send the working address to a rejection queue (block 924). If the operator accepts the regular address (block 922—YES), process 900 may proceed to block 916, to complete the translation.

Figure 10:
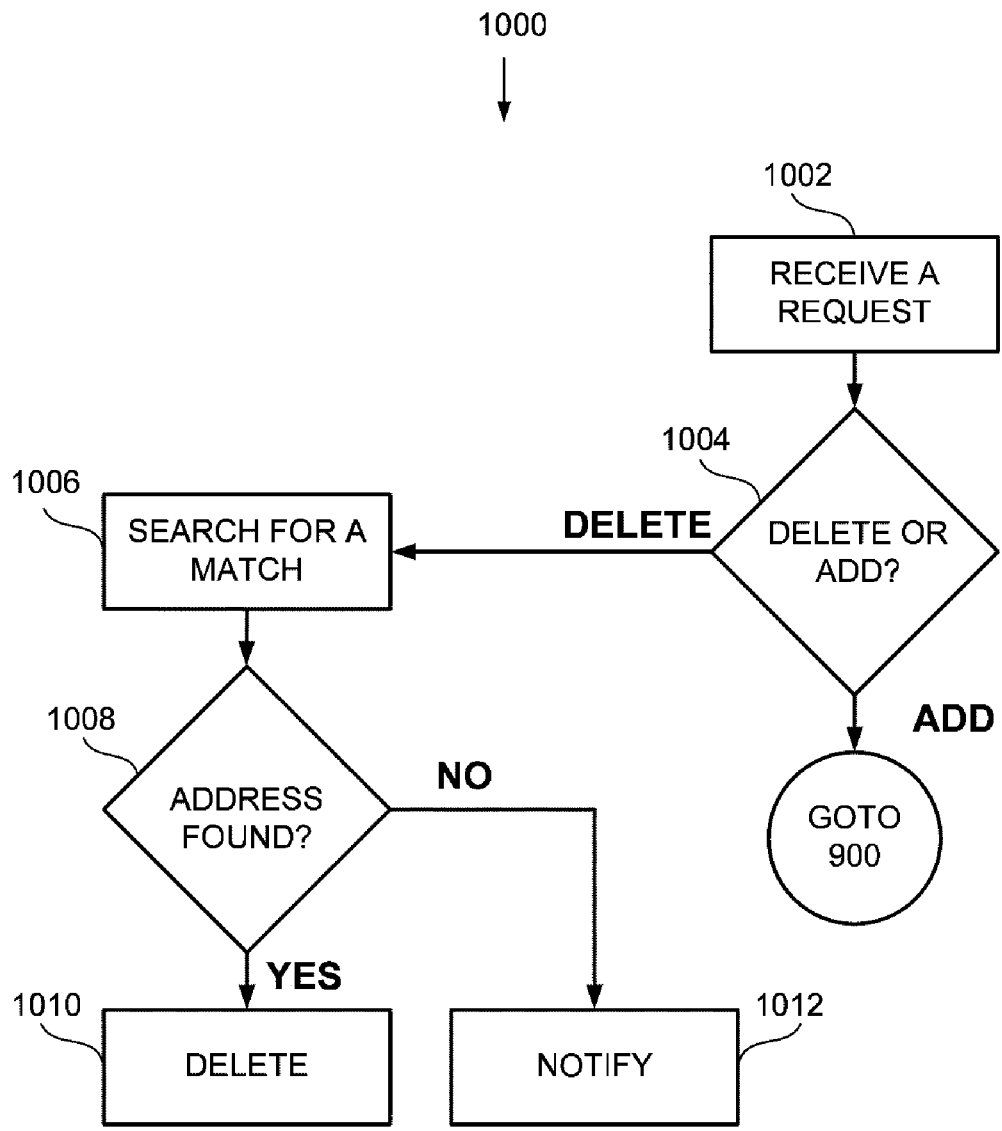
FIG. 10 is a flow diagram of an exemplary process for modifying an exemplary translated address database of FIG. 5.

FIG. 10 is an exemplary process 1000 for modifying translated address database 504. As shown, process 1000 may begin with address translator 510 receiving a request to modify translated address database 504 (block 1002). Thereafter, address translator 510 may determine if the modification entails deleting or adding a working address described in the request from or to translated address database 504 (block 1004).

If the modification entails inserting a working address into translated address database 504 (block 1004—ADD), process 1000 may proceed to process 900 in FIG. 9. If the modification requires deleting the working address described in the request (block 1004—DELETE), address translator 510 may search, in translated address database 504, an entry whose working address or translated address matches the working address described in the request (block 1006). If a matching entry is found (block 1008—YES), address translator 510 may delete the entry from translated address database 504 (block 1010). If no matching entry is found (block 1008), address translator 510 may notify the requestor (e.g., provisioning platform 204) that the requested action cannot be completed.

Figure 11:
FIG. 11 is a list of exemplary groups of tasks that are associated with the working address system of FIG. 2.

As described above, components in working address system 210 may perform acts that are associated with blocks 902 through 924 and block 1002 through 1012. The acts may include tasks, functions, steps, components, or sub-components of processes. FIG. 11 is a list of exemplary groups of such process components, etc., herein referred to as "task groups," that working address system 210 may perform.

As shown in FIG. 11, task groups 1100 may include setting parameters for translation 1102, identifying pending address translations in progress 1104, identifying address changes 1106, handling output 1108, and handling aliases 1110. Task groups 1100 in FIG. 11 are provided for simplicity and ease of understanding. In a different implementation, task groups 1100 may include additional, fewer, or different groups of tasks.

Setting parameters for translation 1102 may include providing parameters to address translator 510 to perform batch address translations (e.g., add groups of entries to translated address database 504), including geocoding. As described above, address translator 510 may geocode working addresses for which matching regular addresses are identified. In addition, address translator 510 may store working addresses, corresponding geocodes, regular or translated addresses, longitudes and latitudes of the regular addresses, and/or match codes in translated address database 504.

Identifying pending translation in progress 1104 may include identifying address translations that have not completed (e.g., address translator 510 has aborted) and completing the address translation (e.g., storing working addresses, geocodes, etc.). Identifying address changes 1106 may include identifying changes to working addresses during the last processing time, and completing the address translation. Handling output 1108 may include completing address translations.

Handling alias 1110 may include tasks for translating working address. For example, a working address may include a street number, street name, city, state, zip code, etc. as s components. In such a case, a task in handling alias 1110 may convert a specific component to a standard term or alias used in regular addresses. For example, the term "suite" in a working address may be converted to alias "ste," a term used in regular addresses.

Figure 12A:
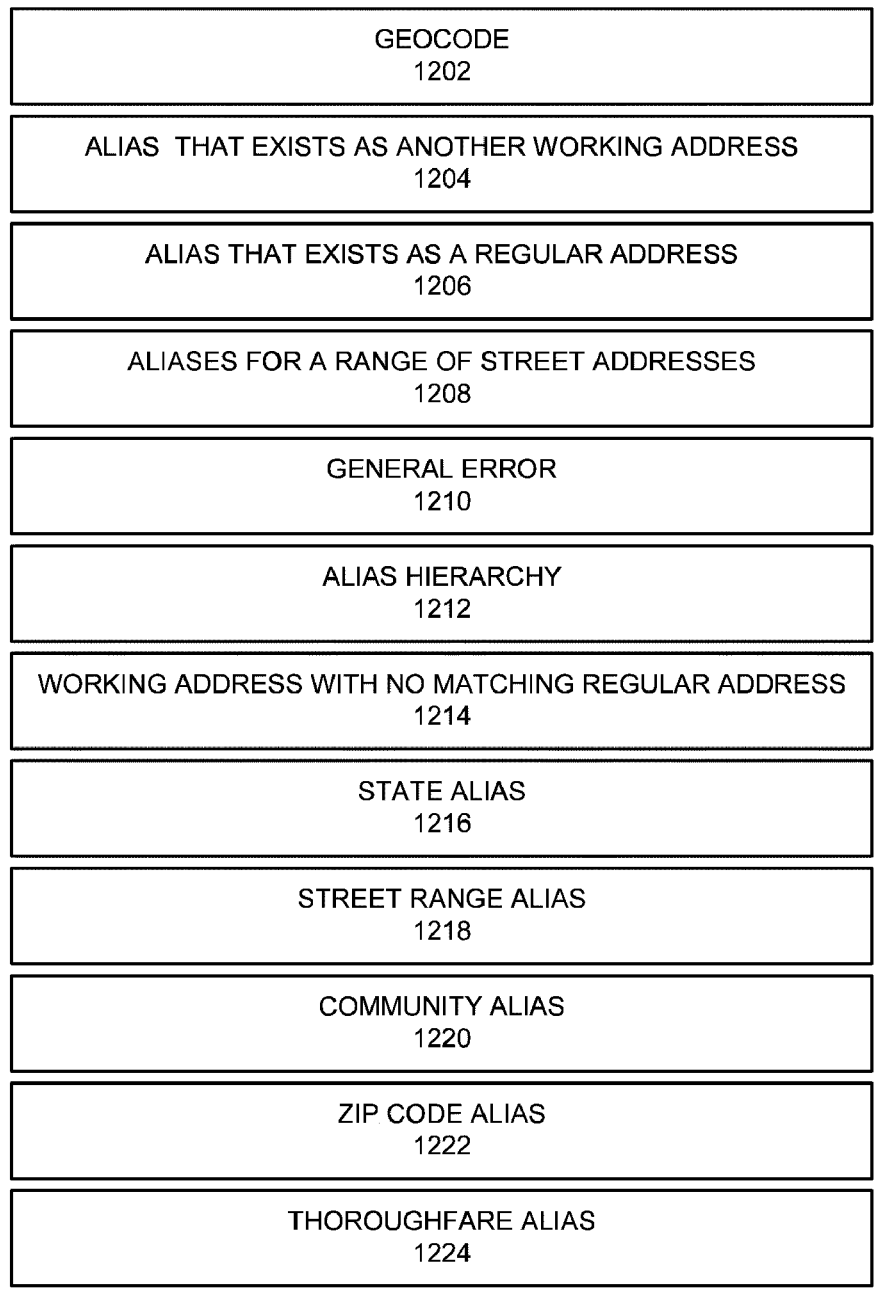
FIGS. 12A and 12B show a list of exemplary tasks for translating each component of a working address into an alias used in regular addresses.
Figure 12B:

FIGS. 12A and 12B illustrate a list of exemplary alias handling tasks 1110 for translating or converting each component of a working address into an alias in regular addresses (i.e., to obtain a translated address). As shown in FIG. 12A, alias handling tasks 1110 may include handling geocode 1202, an alias (e.g., a corresponding regular address) that already exists as another translated address 1204, an alias that already exists as a regular address 1206, aliases for a range of street addresses 1208, a general error 1210, alias hierarchy 1212, a working address without a matching regular address 1214, and a state alias 1216 (e.g., an alias for "Virginia). As further shown, alias handling tasks 1110 may also include handling a street range alias 1218, a community alias 1220, a zip code alias 1222, and a thoroughfare alias 1224.

In relation to handling geocode 1202, address translator 510 may determine a geocode based on a longitude and latitude of a matching regular address and inserting the geocode in translated address database 504 with other relevant data.

In relation to handling an alias that already exists as another translated address 1204, address translator 510 may send the working address to an operator for a review (see block 912 in FIG. 9).

In relation to handling an alias that already exists as a regular address 1206, address translator 510 may create the translated address by copying the regular address and completing the translation process (blocks 904-908).

In relation to handling aliases for a range of street addresses 1208, address translator 510 may discover that looking up working street addresses of a range does not result in locating the same regular street address (e.g., "1010 Main Street" and "1011 Main Blvd"). In such an instance, address translator 510 may send the range of working addresses to the operator for review.

In relation to handling a general error 1210, address translator 510 may discover that translating a working address does not result in automatic aliasing (see block 914 in FIG. 9) or is not rejected (block 924). In such cases, address translator 510 may send the working address to the operator to review the general error.

In relation to handling a hierarchy of aliases 1212, address translator 510 may recognize a community name (e.g., Manhattan, Miami, etc.), zip code, street name, and service location (e.g., apartment number, suite number, etc.). In such cases, address translator 510 may match or convert, in the order of importance, a community name (e.g., to an alias), zip code, street name, and service location to obtain a translated address.

In relation to handling a working address with no matching regular address 1214, address translator 510 may send the working address to the operator for review. Address translator 510 may indicate to the operator that "No regular address has been found."

In relation to handling a state alias 1216, when a matching regular address includes a different state than the working address, address translator 510 may send the working address and/or the proposed translated address to the operator for review.

In relation to handling street range alias 1218, address translator 510 may determine whether houses in a street address range have the same street alias (e.g., based on matching regular addresses). If the same street alias corresponds to all houses in the street address range, address translator 510 may generate a street range alias. If the houses do not have the same street alias, address translator 510 may send the range of working addresses to the operator for review.

In relation to handling community alias 1220, address translator 510 may perform the following: if a community name is the only difference between the working address and a corresponding regular address, and the community alias in the regular address is equivalent to a postal area name or primary zip code area, then, address translator 510 may determine that the working address matches the regular address and complete the working address translation. If address translator 510 does not find a match due to a difference in community names in the working address and the regular address, address translator 510 may send the working address to the operator for review.

In relation to handling zip code alias 1222, when a zip code is the only difference between a working address and a corresponding regular address, address translator 510 may determine whether the zip code (of the regular address) already exists in a zip code table. If the zip code exists, address translator 510 may determine whether house numbers in a range have the same zip code. If so, address translator 510 may complete the translation for the addresses. If the zip code does not exist in the zip code table, or if all houses in a range of street addresses do not have the same zip code, address translator 510 may send the working address to the operator for review.

In handling thoroughfare alias 1224, address translator 510 may use standard address documents (e.g., Rocket Docket documents, Postal Thoroughfare Mapping document, etc.) as a dictionary to translate/convert thoroughfare tags (e.g., Street, Road, etc.) to thoroughfare aliases (e.g. St., Rd., etc.) in regular addresses. If a thoroughfare tag does not convert to a thoroughfare alias (e.g., not in a "dictionary" of tags), address translator 510 may send the working address to the operator, indicating that the street names of the working address and the translated address are different.

FIG. 12B illustrate an additional list of exemplary alias handling tasks 1110. As shown in FIG. 12B, alias handling tasks 1110 may include handling a direction alias 1226, a street name 1228, house numbers 1230, a house number suffix 1232, and a supplemental alias 1234.

Address translator 510 may handle direction alias 1226 under different scenarios. For example, if a direction tag (e.g., East, West, etc.) in a working address differs from a direction alias (e.g., E, W, etc.) in a regular address, address translator 510 may send the working address to the operator, indicating a difference in the street names. If the direction tag differs from a direction alias in their relative positions within their respective addresses, address translator 510 may complete the address translation and store relevant values and parameters (e.g., geocode). If a direction tag does not exist and a corresponding direction alias exists, alias translator 510 may complete the address translation.

If a direction tag is a first word of a street name, if a corresponding direction alias is an abbreviation, and if remainder of the working address matches the regular address, address translator 510 may complete the translation. If the remainder of the working address includes another difference, address translator 510 may send the working address to the operator.

Address translator 510 may handle street names 1228 under different scenarios. For example, if a street name in a working address is a number, expressed in numeric characters or alphabet, and if a street name in the corresponding regular address is the same number, expressed in either numeric characters or alphabet, then address translator 510 may complete the address translation.

When a working address exactly matches a regular address, address translator 510 may check whether a last word of the street address in the working address is a thoroughfare tag (e.g., the word "Way" in "100 Arabian Way, Manhattan") and the last word of the street address in the regular address is part of the street address and not a thoroughfare alias. In such a case, address translator 510 may send the working address to the operator.

In handling house number 1230, address translator 510 may remove a hyphen in a street number during a translation of working address.

Address translator 510 may also handle house number suffix 1232. In one implementation, address translator 510 may translate a house number suffix to a supplemental address, and send the working address to the operator for review.

Address translator 510 may also handle supplemental alias 1234. For example, address translator 510 may map supplemental tags, BLDG, PIER, WNG, FLR, APT, LOT, RM, SLIP, SUIT, and UNIT in working addresses to supplemental aliases BLDG, PIER, WING, FL, APT, LOT, RM, SLIP, STE, and UNIT, respectively. When a supplemental tag in a working address does not correspond to a supplemental alias in a matching regular address/translated address, address translator 510 may send the working address to the operator for review.

Depending on the implementation, alias handling tasks 1110 may include, additional, fewer, or different tasks than those illustrated in FIGS. 12A and 12B. For example, in one implementation, alias handling tasks 1110 may include a task for handling multiple supplemental aliases in a working address.

In the above description, working address system 210 may translate and geocode working addresses based on regular addresses. By translating working addresses and geocoding the translated addresses (when possible), working address system 210 may provide advantages and convenience associated with the geocoded, regular addresses. For example, regular addresses (e.g., United States Postal Service (USPS) addresses) may be standardized. In another example, geocoding may provide a simple representation of a location.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, while series of acts/blocks have been described with one or more flow diagram, the order of acts/blocks may be varied in other implementations. Moreover, non-dependent acts/blocks may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
    a memory configured to:
        store a regular address database including a plurality of first records that identify regular addresses and corresponding location coordinates, and
        store a translated address database including a plurality of second records that identify working addresses, corresponding translated addresses or references to the regular addresses, and geocodes associated with the corresponding translated addresses; and
    a processor configured to:
        perform a lookup, in the regular address database, to determine whether a working address substantially corresponds to at least one regular address identified in the first records,
        determine, when the working address does not substantially correspond to the at least one regular address, whether the working address qualitatively matches the at least one regular address and is to be automatically converted into a corresponding translated address comprising aliases that correspond to terms in the working address;
        convert the working address to generate the corresponding translated address when the working address is to be automatically converted;
        create a second record identifying the working address and the corresponding translated address or a reference to the at least one regular address; and
        store the second record in the translated address database.

2. The device of claim 1, wherein the regular addresses identified in the first records comprise United States Postal Service (USPS) addresses.

3. The device of claim 1, wherein the processor is further configured to:
    obtain, from a first record identifying the at least one regular address, the corresponding location requirements associated with the at least one regular address,
    convert the corresponding location requirements to a geocode associated with the corresponding translated address, and
    insert the geocode into the second record, the device further comprising:
    a network interface configured to:
        receive, from a remote device, a request for a translated address associated with the geocode; and
        send the corresponding translated address to the remote device in response to the request.

4. The device of claim 1, wherein the at least one regular address includes:
    a regular address that exactly matches the working address, and the processor is further configured to:
    generate and store, in the translated address database, a geocode associated with the regular address.

5. The device of claim 1, wherein the at least one regular address includes:
    a standardized address that does not exactly match the working address, and wherein the processor is further configured to:
    generate and store in the translated address database, upon receiving approval of an operator, a geocode associated with the standardized address.

6. The device of claim 3, wherein the geocode comprises a United States National Grid (USNG) code or a Natural Area Code (NAC) code.

7. The device of claim 1, wherein the processor is further configured to:
    receive, from a remote device, a request for translated corresponding addresses, corresponding to locations that are within a particular search area;
    retrieve a subset of the second records identifying the corresponding translated addresses from the translated address database; and
    send the retrieved subset of the second records to the remote device.

8. The device of claim 7, wherein the particular search area is bounded by longitudes and latitudes.

9. The device of claim 1, wherein when the at least one regular address substantially corresponds to the working address, the processor is further configured to:
    receive a request to translate the working address based on an operator's approval.

10. The device of claim 1, wherein the processor is further configured to:
    identify a record in the translated address database based on a second working address; and
    delete the record when the record in the translated address database is identified.

11. A method comprising:
    receiving, from a first remote device, a request to translate a working address;
    performing a lookup, in a regular address database including a first record that identifies at least one regular address and corresponding location coordinates, to determine whether the at least one regular address substantially corresponds to the working address;
    determining, when the working address does not substantially correspond to the at least one regular address, whether the working address qualitatively matches the at least one regular address and is to be automatically converted into a corresponding translated address comprising aliases that correspond to terms in the working address;

converting the working address to generate the corresponding translated address, when the working address is to be automatically converted;

creating a second record identifying the working address and the corresponding translated address or a reference to the at least one regular address;

storing the second record in a translated address database; and transmitting the corresponding translated address to the first remote device or a second remote device.

12. The method of claim 11, wherein the converting the working address includes:

generating a geocode based on a longitude and latitude identified in the corresponding location coordinates associated with the at least one regular address.

13. The method of claim 11, wherein the converting the working address includes at least one of:

sending the working address to an operator to be reviewed when the working address is not to be automatically converted; or sending the working address to the operator to be reviewed when the working address does not qualitatively match the at least one regular address.

14. The method of claim 11, wherein the converting the working address includes:

recognizing a community name, zip code, street name, and service location in the working address; and obtaining aliases, in an order of importance, for the recognized community name, zip code, street name, and service location.

15. The method of claim 11, wherein the converting the working address includes:

sending the working address to an operator to be reviewed when the at least one regular address includes an alias of a different state than a state indicated in the working address; or sending the working address to the operator to be reviewed when translated addresses of a range of house numbers in the working address do not have a same street name alias.

16. The method of claim 11, wherein the converting the working address includes:

sending the working address to an operator to be reviewed when a thoroughfare tag in the working address does not match a thoroughfare alias in the at least one regular address;

sending the working address to the operator to be reviewed when a house number suffix is mapped to a supplemental address; or removing a hyphen in a street number of the translated working address.

17. The method of claim 11, wherein the converting the working address includes:

determining that the working address matches the at least one regular address when a community name in the working address and a corresponding community alias in the at least one regular address are different, and when the community alias is equivalent to a postal area name or prime zip code area; and sending the working address to an operator when the working address does not match the regular address.

18. The method of claim 11, wherein the converting the working address includes:

determining whether a zip code for the working address exists within a zip code table when the zip code is the only difference between the working address and the at least one regular address;

determining whether house numbers in a range have the same zip code when the zip code is determined to exist;

converting the working address when the house numbers in the range have the same zip code; and sending the working address to the operator for review when the zip code does not exist in the zip code table or when the house numbers in the range do not have the same zip code.

19. The method of claim 11, wherein the converting the working address includes:

mapping supplemental tags in the working address to supplemental aliases that appear in the at least one regular addresses; and sending the working address to an operator to be reviewed when there is no supplemental alias that corresponds to a supplemental tag in the working address.

20. The method of claim 11, wherein the converting the working address includes:

sending the working address to an the operator when a directional tag in the working address differs from a directional alias in the at least one regular address; or converting the working address when a relative position of a directional tag in the working address differs from a relative position of a corresponding directional alias in the at least one regular address.

21. The method of claim 11, wherein the converting the working address includes:

converting the working address when a directional tag, which corresponds to a directional alias in the at least one regular address, in the working address does not exist; or converting the working address when a directional tag in the working address is a first word of a street name, when a corresponding directional alias in the at least one regular address is an abbreviation, and when a remainder of the working address matches a remainder of the at least one regular address.

22. The method of claim 11, wherein the converting the working address includes:

sending the working address to an operator when a directional tag in the working address is a first word of a street name, when a corresponding directional alias in the regular address is an abbreviation, and when a remainder of the working address does not match a remainder of the regular address.

23. The method of claim 11, wherein the converting the working address includes:

converting the working address when a street name in the working address is a number, being expressed in numeric characters or alphabet and when a street name in the at least one regular address is the same number, being expressed in either numeric characters or alphabet; and sending the working address to an operator when spelling of the working address exactly matches spelling of the at least one regular address and when a last word of a street address in the working address is a thoroughfare tag and a last word of the street name in the at least one regular address is part of the street address and not a thoroughfare alias.

* * * * *